(12) United States Patent
Grechanik et al.

(10) Patent No.: US 8,370,811 B2
(45) Date of Patent: Feb. 5, 2013

(54) MODULARIZING AND ASPECTIZING GRAPHICAL USER INTERFACE DIRECTED TEST SCRIPTS

(75) Inventors: Mark Grechanik, Chicago, IL (US); Qing Xie, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 873 days.

(21) Appl. No.: 12/504,467

(22) Filed: Jul. 16, 2009

(65) Prior Publication Data

US 2011/0016453 A1 Jan. 20, 2011

(51) Int. Cl.
*G06F 9/44* (2006.01)
(52) U.S. Cl. ........................................ 717/125
(58) Field of Classification Search .................. None
See application file for complete search history.

(56) References Cited

U.S. PATENT DOCUMENTS

| | | | |
|---|---|---|---|
| 7,526,498 B2 * | 4/2009 | Dubovsky ............... | 707/102 |
| 2005/0268285 A1 * | 12/2005 | Bagley et al. ............ | 717/124 |

OTHER PUBLICATIONS

Compuware, The Leader in IT Value, "Accelerate Testing and Deliver High Quality Applications on Time," 2008 Compuware Corporation, 2 pages.

Grechanik et al., "Reducing Effort in Script-Based Testing," Accenture Technology Labs, Systems Integration Group, Chicago, Illinois, Nov. 11, 2007, pp. 1-22.
Hewlett-Packard Development Company, "HP Functional Testing Software, BTO Software," 2008, 1 page.
Hewlett-Packard Development Company, HP QuickTest Professional Software, data sheet, 2007, 4 pages.
IBM, "Rational Robot, Features and Benefits," "Rational Software," undated, 1 page.
IBM, "Rational Robot, Overview," "Rational Software," undated, 1 page.
Pierce, Benjamin C., "Types and Programming Languages," The MIT Press, Cambridge, Massachusetts, 2008, ISBN 0-262-16209-1, complete book.

* cited by examiner

*Primary Examiner* — Henry Tsai
*Assistant Examiner* — Juanito Borromeo
(74) *Attorney, Agent, or Firm* — Brinks Hofer Gilson & Lione

(57) ABSTRACT

A test structure for testing graphical user interface applications (GAPs) modularizes test scripts by separating statements that define GAP test logic from statements that navigate to GAP objects. Composition rules weave the statements together to generate the test scripts that are executed to test the GAP. Because the test structure is modular, test logic can be reused across different GAPs and different versions of the same GAP. Reusing test logic is not only an efficient practice from a test engineer's point of view, but also leads to a reduction in test programming errors. The modular test structure also facilitates the efficient modification of test scripts to account for modifications in the underlying GAPs, greatly reducing the time, cost, and resource expenditures needed to arrive at updated test scripts.

21 Claims, 14 Drawing Sheets

GSGETOBJECT:

$$\frac{S_T(o_T) = (c, \{object \mapsto o_T'\}) \quad (G, a, S_G) \in TS \quad (G, S_G) \vdash getObject(o_G, \{\langle p_i = v_i \rangle\}) = v'}{\langle T, \mathbb{E}[o_T], S_T \rangle, TS \hookrightarrow \langle T, \mathbb{E}[o_T], S_T[o_T \mapsto \langle c, \{object \mapsto v'\} \rangle] \rangle, TS}$$

MODULARIZING AND ASPECTIZING GRAPHICAL USER INTERFACE DIRECTED TEST SCRIPTS

BACKGROUND OF THE INVENTION

1. Technical Field

This disclosure relates to testing graphical user interface (GUI) applications using test scripts, and in particular relates to systems and methods for creating test scripts that are reusable and/or adaptable for testing different GUI applications and/or different versions of GUI applications.

2. Related Art

The relentless pace of advancing technology has given rise to complex computer software applications that help automate almost every aspect of day-to-day existence. Today, applications exist to assist with writing novels to filing income tax returns to analyzing historical trends in baby names. One nearly ubiquitous feature of these applications is that they employ graphical user interfaces (GUIs). GUIs implement graphical windows, pointers, icons, and other features through which users interact with the underlying program. A program implemented with GUIs is referred to as a GUI application (GAP). GAPs require thorough testing prior to release.

In the past it has been easier to implement the GUI to the application than to thoroughly test the GAP. For GAPs of any significant complexity, the permutations and combinations of GUI elements gives rise to an enormous field of potential commands and command sequences that could have bugs of any severity, from insignificant to critical failure. Thus, GAPs must be thoroughly tested to ensure that the GUIs interact with the user as intended. Manually testing large-scale enterprise GAPs is tedious, error prone, and laborious. As an alternative to manual testing, test engineers develop test scripts to automate GAP testing.

Test scripts include navigation statements and logic statements. The navigation statements access and manipulate or retrieve properties of GUI objects, while the logic statements determine whether the GAP is functioning as intended. When executed, these test scripts drive the GAPs through different states by mimicking the activity of users interacting with the GAPs by performing actions on the GUI objects. Test scripts process input data, set values of GUI objects using the data, act on the GUI objects to cause the GAP to perform computations, access other GUI objects to retrieve computation results, and compare the outcome with the expected results. Many different test scripts must be written to test the different GUIs and functions of a GAP. As an example, testing a travel reservation GAP will require different test scripts to test the different GUI objects that are displayed as a user navigates through the GAP to book the departure flight, reserve a hotel and/or automobile, book the return flight, and make other travel arrangements. One test script may determine whether the GAP displays correct return date options in response to a user selecting a specific departure flight, while another test script may determine whether the hotel reservation dates are correct in response to the same user selection. To thoroughly test the travel reservation GAP, many more test scripts must be written.

Although determining whether correct dates are displayed is a ubiquitous test applicable to many different types of GAPs, test scripts (e.g., the travel reservation test scripts) are not transportable to test other types of GAPs because the logic statements are intertwined with the GAP-dependent navigation statements in order to access and test the GUI objects within the GAP. Also, test scripts are difficult to update when GAPs are modified (i.e., different versions of the same GAP) because the navigation statements that must be rewritten are scattered among many different test scripts. Test engineers have found that test scripts are not easily transportable even between different versions of the same GAP and in most cases prefer writing new test scripts from scratch over modifying existing test scripts.

There are additional obstacles to generating test scripts that are transportable across different GAPs or different versions of the same GAP. In one method of generating test scripts, capture/replay tools are used to record mouse coordinates and user actions. However, because capture/replay tools use mouse coordinates, changing the GUI layout, even slightly, will usually render the test scripts ineffective. Another method of generating test scripts, referred to as "testing with object maps," captures the values of properties of GUI objects (rather than just the mouse coordinates). Test engineers assign unique names to collections of the values of the properties of the GUI objects, and then use the names in test script statements to reference the objects. In theory, changes to a GUI layout can be accounted for by modifying the values of the properties of the GUI objects, which are usually stored in an object repository. However, updating GUI tests that are based on object maps is difficult, if not prohibitive, when even small changes to a GUI are made because of the interdependencies explained below.

Navigation And Manipulation Expressions (NAMEs) are the expressions used in test scripts to navigate to GUI objects, set or retrieve the values of the GUI objects, or act on them. NAMEs include application programming interface (API) calls having objects that hold the values of the properties of the GUI objects being tested. Different testing frameworks export different API calls to access and manipulate the GUI objects. Thus, NAMEs are dependent on the GUI object type (e.g., list box, text box, etc.), the location of the object on the screen, and the underlying GUI testing framework. Because NAMEs reference GUI objects by their properties, even the slightest change to a GUI object can invalidate all NAMEs within test scripts that reference the GUI object. For example, changing a GUI object from a combo box to a text box will, almost invariably, invalidate all NAMEs in the original test scripts that reference the GUI object. The interdependence between NAMEs and testing logic renders test scripts hard-wired to specific GAPs and testing frameworks. Transportability of test scripts is further exasperated because GUI object creation is dependent upon the underlying GUI framework, which may differ between different GAPs. For these reasons, test scripts based on NAMEs, to date, have not been reusable even between GAPs that have the same functionality, thereby obliterating a potential benefit of test automation.

Additional difficulties in testing GAPs exist because three "type systems" are involved: the type system of the language in which the source code of the GAP is written, the type system of the underlying GUI framework, and the type system of the language in which the test script is written. If the type of the GUI object is modified, the type system of the test script "will not know" that this modification occurred, which complicates the process of maintaining and evolving test scripts. Test scripts do not contain any typing information in them. They do not use the type system of the GUI framework, which is not a part of the scripting language interpreter, and they do not have access to the type system of the programming language in which the GAPs are written. Because of the absence of type systems within test script languages, programmers cannot detect errors statically, obtain adequate documentation, and maintain and evolve test scripts effectively.

For all of its limitations, test script based testing, as compared to manual testing, results in an overall reduction in labor for testing GAPs. To help further reduce the labor of testing GAPs, test engineers create models of GAPs and generate the test scripts by using tools that process the modeled GAPs. Model-based testing includes building high level models of GAPs and implementing algorithms that construct test cases. However, this modeling process for generating test scripts is not without significant limitations. For example, building high level models of GAPs is laborious and difficult and there are obstacles to building models directly from the source code of the GAPs. For one, the values of variables of GUI objects are known only at runtime, i.e., in conjunction with the execution of the API calls. Thus, GUI models cannot be derived from source code alone. Also, deriving models from the source code would require (a) knowing the semantics of API calls that create and manipulate GUI objects, (b) developing tools that extract GUI models from GUI resource repositories, and (c) knowing the GUI application language. Currently, there are tens of thousands of combinations of (a), (b), and (c), making it difficult to develop a universal approach to deriving GUI models. What's more, the source code of a GAP is usually not made available to the independent testing organizations that are contracted to test proprietary GUI software. Thus, there are significant challenges to model-based-test-script generation.

There are several obstacles that prohibit GAP testing using other techniques. For one, because GUI objects are created dynamically, i.e., only when the GAP is executed, GAPs cannot be tested statically, such as by examining the GAP source code. Also, because a test script is run on a platform that is external to the GAP platform, GUI objects cannot be accessed as programming objects that exist within an integrated program. And because complete specifications of GUI objects are usually not available, it is difficult to analyze statically how GUI objects are accessed and manipulated by NAMEs.

Therefore, a need exists for a GAP testing structure that implements readily modifiable and reusable test scripts.

SUMMARY

A test structure for testing graphical user interface applications (GAPs) modularizes test scripts by separating statements that define test logic from statements that navigate to GAP objects. Composition rules weave these two kinds of statements together to generate the test scripts that are executed to test the GAP. Separating the logic statements from the navigation statements provides a modular test structure whereby the same test logic can be reused across different GAPs and different versions of the same GAP. Reusing test logic is not only an efficient practice from a test engineer's point of view, but also leads to a reduction in test programming errors. The modular test structure also facilitates the efficient modification of test scripts to account for modifications in the underlying GAPs, greatly reducing the time, cost, and resource expenditures needed to arrive at updated test scripts.

The test structure implements object oriented navigation code in which GAPs are represented as programming objects and GUI objects are represented as fields within the programming objects. The test structure includes test logic to invoke methods that perform actions on the programming objects. The methods are invoked on the programming objects in the GAP via an accessibility interface that provides access to the GUI objects as they become available in the GAP. Method calls invoke NAMEs to locate the GUI objects and extract their values. The values are passed from the GAP back to the testing logic through the accessibility interface.

Using this test structure, the test logic need not be intertwined with NAMEs to test a specific GAP. Rather, the test logic is applied to a GAP by defining pointcuts in the GAP, using an aspect-oriented type programming language. When the GAP activates a join point, the test logic is activated. Therefore, the same test logic may be applied to different GAPs by defining GAP specific pointcuts in a GAP. If a GAP is modified, the pointcuts are simply redefined to maintain the validity of the testing logic.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIGS. 11, 12, and 13 shows a set of reduction rules that may be used to apply advice to join points.

DETAILED DESCRIPTION OF THE PREFERRED EMBODIMENTS

Figure 1:
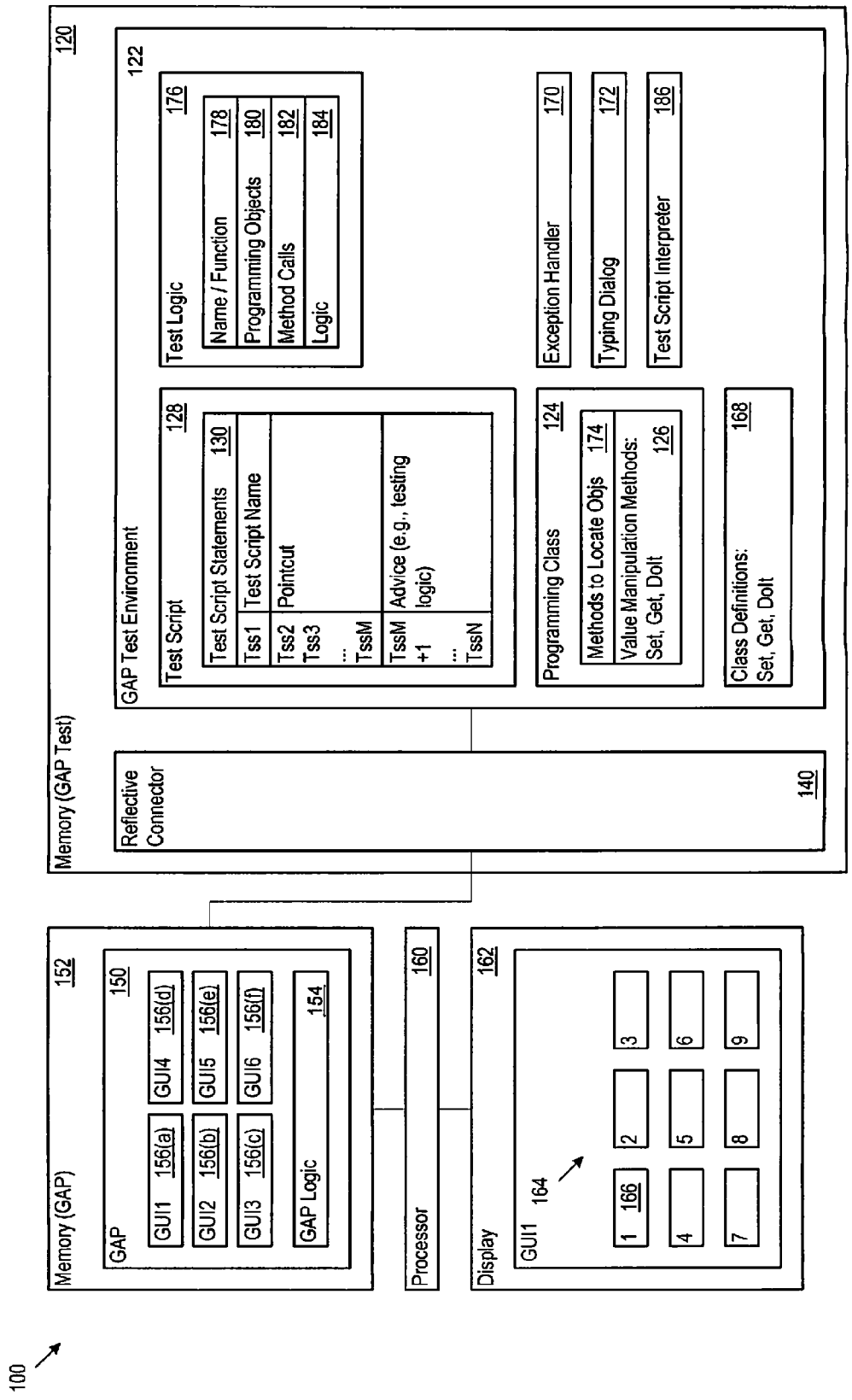
FIG. 1 illustrates a system that includes a memory having program elements for testing a graphical user interface application program executed from memory by a processor.

FIG. 1 illustrates a test script execution system 100 ("system 100") that includes a memory 120 having program elements for testing a graphical user interface application (GAP) 150 executed from memory 152 by a processor 160. The GAP 150 is depicted generally as having GAP management logic 154 for implementing the logical execution of a graphical user interface (GUI) program, and generating graphical user interfaces (e.g., $GUI_1$-$GUI_N$ (156(a)-156(f))). The processor 160 executes the GAP management logic 154 which in turn may cause one or more of the GUIs $GUI_1$-$GUI_N$ (156(a)-156(f) to appear on the screen 162. Each GUI 156(a)-156(f) may include any number of GUI elements 164, such as text boxes, radio buttons, drop down menus, scroll bars, or other GUI elements. A specific GUI element 166 is labeled in FIG. 1.

The program elements stored in memory 120 include a GAP test environment 122 and a reflective connector 140. The GAP test environment 122 includes a test script 128, test logic 176, a test script interpreter 186, programming classes (such as the programming class 124), class definitions 168, an exceptions handler 170, and a typing dialog 172. The processor 160 executes the GAP test environment 122 to test any desired logic of the GAP 150. Although only one test script 128 is shown in FIG. 1, GAP test environment 122 may include any number of test scripts to partially or completely test the GAP 150. The test script 128 may interact as a plug-in to a host application such as Eclipse™ (not shown).

As explained in more detail below, the GAP test environment 122 generates a programming class 124 for, by way of example, the specific GUI object 166 of the GUI objects 164. The programming class 124 includes methods to locate GUI objects 174 and value manipulation methods 126 that are called by test script statements 130 within the test script 128. When executed, the test script statements 130 reference the GUI objects 164 as programming objects and the reflective connector 140 provides access to the GUI objects 164. In connection with executing the test script statements 130, one or more of the methods to locate GUI objects 174 and the value manipulation methods 126 interact through the reflective connector 140 to obtain and/or manipulate one or more values of the programming object 166. The reflective connector 140 may be implemented in an accessibility layer, described below.

The program elements for testing the GAP 150 separate the test script 128 into two orthogonal concerns: high-level test logic 176 that tests the GAP computations, and low-level sequences of instructions (test script statements 130) that specify how GUI objects are located and manipulated on the GAPs. The test script may be automatically generated by composition rules that weave the high-level test logic 176 with the test script statements 130. The high-level test logic 176 is GAP and test platform independent and may be applied in a modular fashion to test different GUIs and GAPs.

Figure 2:
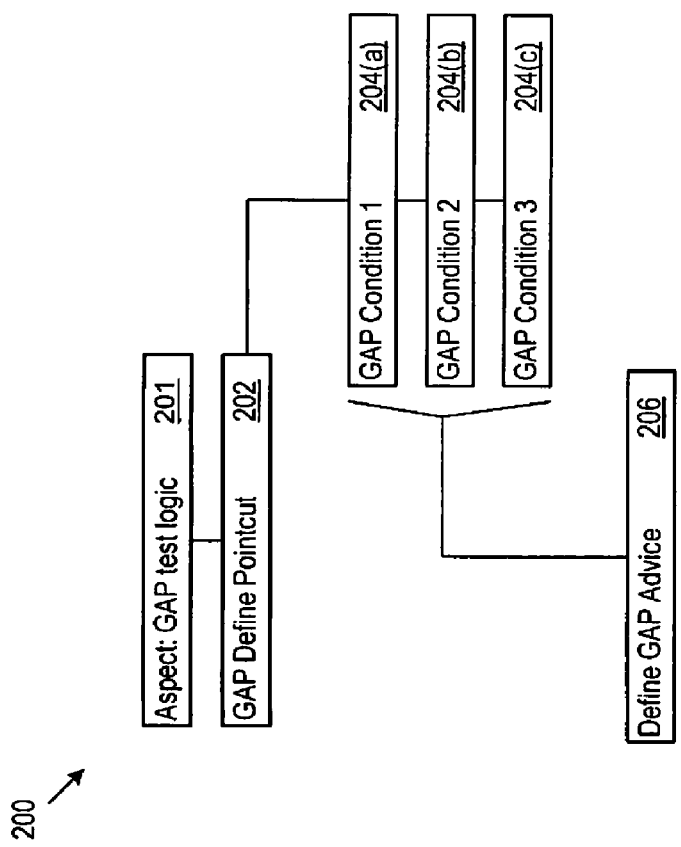
FIG. 2 shows a format for the test script of FIG. 1.

In one implementation, the programming language of the test script 128 resembles that of aspect-oriented programming paradigm. The programming language supports inter-type declarations, pointcuts, and advice. A version of a format of the test script 128 is shown as 200 in FIG. 2. The test logic is declared as the aspect 201. The pointcut 202 defines a set of conditions 204(*a*)-204(*c*) as join points that must be met before the advice 206 is executed. Details of each element within the test script 128 are discussed further below.

An example of a test script that tests the dates displayed in GUIs of travel GAPs is provided in Table 1.

TABLE 1

| | | Test Script Example |
|---|---|---|
| GAP Test Logic | 1 | public aspect TestTravelReservationLogic { |
| GAP Pointcut | 2 | pointcut TravelDates ( ) : |
| | 3 | object (current active GUIObjectDate retDate) && |
| | 4 | object (current active GUIObjectDate depDate) && |
| | 5 | GAP(App1, App2, App3) && |
| | 6 | ! (GAP(App4) || |
| | 7 | handler (EventException) || |
| | 8 | event (LOADING) ); |
| GAP Advice | 9 | before ( ) :   TravelDates ( ) { |
| | 10 | // verify checkpoints, e. g., no dialogs, |
| | 11 | // no popups. Make sure that selected GUI |
| | 12 | // objects can be used in the testing |

TABLE 1-continued

| | Test Script Example |
|---|---|
| | // logic in the around and the after advice } |
| 13 | |
| 14 | around ( ) : TravelDates ( ) { |
| 15 | TestLogic4Dates ( );    } |
| 16 | after ( ) : TravelDates ( )     { |
| 17 | ButtonSearch.Click ( ) ; } } |

In this example, test logic is declared as the aspect TestTravelReservationLogic in line 1. In lines 2-8 the pointcut TravelDates specifies the join points in the GAP that trigger the testing logic defined as an advice (lines 9-17). Lines 3 and 4 specify that the programming objects retDate and depDate that have the type GUIObjectDate are bound to their corresponding GUI objects as qualified by the 'current' and 'active' specifiers. In other words, the corresponding GUI objects must have active binding and current instantiation on the GUI screens of the applicable GAPs (any one of App1, App2, or App3) (line 5). However, the testing logic should not be applied to the GAP App4, as specified in line 6. The GAP must not generate an event exception (line 7), and the GAP should finish loading the GUI screen (line 8) before the test logic is triggered.

In this version of the programming language, there are three types of advice: before, around, and after. The advice 'before' adds code that specifies and verifies checkpoints, e.g., no dialog or popup windows are presently active in the GAP. The advice 'before' also ensures that selected GUI objects can be used in the testing logic in the 'around' and the 'after' advice. In this example, the advice 'before' checks whether the button "Search" is enabled in order to verify that the GUI screen is in the correct state for the test.

The advice 'around' and 'after' reference the test logic and the action that is to be performed on the GUI objects, such as switching the GAP to a new state. Specifically, when the 'around' advice is triggered, the function TestLogic4Dates ( ), shown in Table 2, executes to test whether the return date is earlier in time than the departure date.

TABLE 2

| Test Logic "TestLogic4Dates" |
|---|
| 1 void TestLogic4Dates ( ) { |
| 2   GUIObjectDate retDate , depDate ; |
| 3   depDate . setValue( GetRandomDate( ) ); |
| 4   retDate . setValue( GetRandomDate( ) ); |
| 5   int diff = retDate . get Value ( ) – |
| 6                           depDate . getValue ( ); |
| 7   if( diff <= 0) // report test failure; |
| 8   else // report passed test} |

The test logic is encapsulated in the function 178 TestLogic4Dates (line 1), in which two programming objects 180 retDate and depDate are declared (line 2). These objects represent GUI objects on travel GAPs that hold values of the return and departure dates. The value of the departure date is set using the method 182 setValue to a randomly generated date using the function GetRandomDate (line 3). The value of the return date is also set (line 4). The difference between the values of the return and departure dates is computed 184 (lines 5-6). If the difference is less than or equal to zero, the test logic 176 reports failure (line 7); otherwise the test logic 176 reports pass (line 7).

This example illustrates how cross-cutting concerns of GAPs are modularized in the test logic 176. GUI objects 164 are represented as programming objects 180 in the test logic, thereby replacing NAMEs with GUI structure-neutral operations on the programming objects. NAMEs are not tangled with the test logic 176; the logic can be universally applied to different GAPs or different versions of the same GAP. The test logic operations are later translated into NAMEs when test methods are invoked and/or when values of objects are set or retrieved. Once the operations are translated into NAMEs, they are executed by the underlying testing framework. This example demonstrates that test logic may be written without reference to and independent of all NAMEs.

The test logic in Table 2 contains a single concern (verifying dates) that may be applied in a modular fashion to different GAPs. When a requisite GUI screen is activated and its GUI object(s) become available, the test logic that references the available objects is executed. Thus, rather than carrying out the complex, laborious task of writing the test logic directly into the test scripts, the test logic 176 and test scripts 128 are written (and may be used) separately and are woven together automatically to test the GAP 150.

Figure 3:
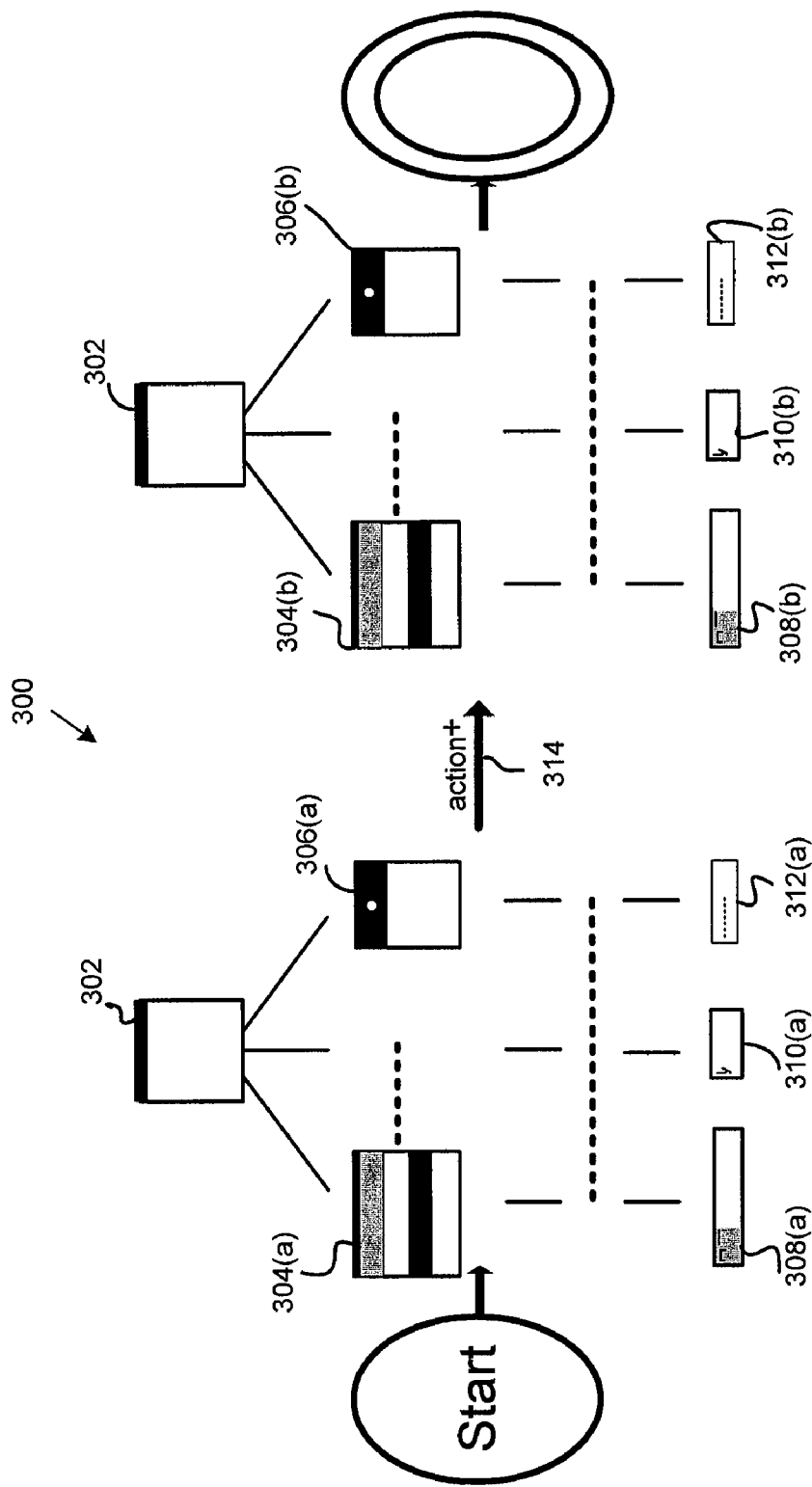
FIG. 3 illustrates a schematic state machine showing states of a GUI screen.

As discussed above, within the test structure of the present disclosure the GUI objects are represented as programming objects. This test structure provides a mechanism for setting and retrieving the values of the properties of the GUI objects in the GAP, and provides access for invoking GUI operations. Another way of characterizing this aspect of the test structure is to regard a GUI object as a class residing inside of a web service. This characterization is represented visually in FIG. 3, which illustrates a schematic state machine 300 showing transitions between screens 304(*a*), 306(*a*), 304(*b*), 306(*b*) of a GAP 302. The GUI screens consists of a collection of GUI objects 308(*a*), 310(*a*), 312(*a*), 308(*b*), 310(*b*), 312(*b*) and therefore may also be regarded as a class having fields that are instances of the classes of its GUI objects. At a higher level, a GAP may also be regarded as a class having fields that are instances of the classes of its GUI screens. In FIG. 3, the GAP 302 is regarded as a state machine having its states defined as collections of GUI objects 308(*a*), 310(*a*), 312(*a*), 308(*b*), 310(*b*), 312(*b*), the GUI object properties (e.g., style, read-only status, etc.), and the GUI object values. In a new state, a GUI object may remain the same, but its values and properties may change. A GAP transitions to a new state in response to an action 314 prompted by a web service. The GAP 302 is thus a programming object that is transitioned between states by a web service.

The GAP test environment 122 includes elements that identify a GAP state as either a final state or an intermediate state, and may apply test logic to only final states. An example of a GAP final state is a destination page, such as a web page showing departure flights. An example of a GAP intermediate state is a progress page, such as a an animated hour glass. The GAP test environment 122 identifies final states by analyzing the structure of the GAP and its GUI objects. The analysis includes traversing GUI trees and comparing them to trees that have been recorded in response to user operations.

Figure 4:
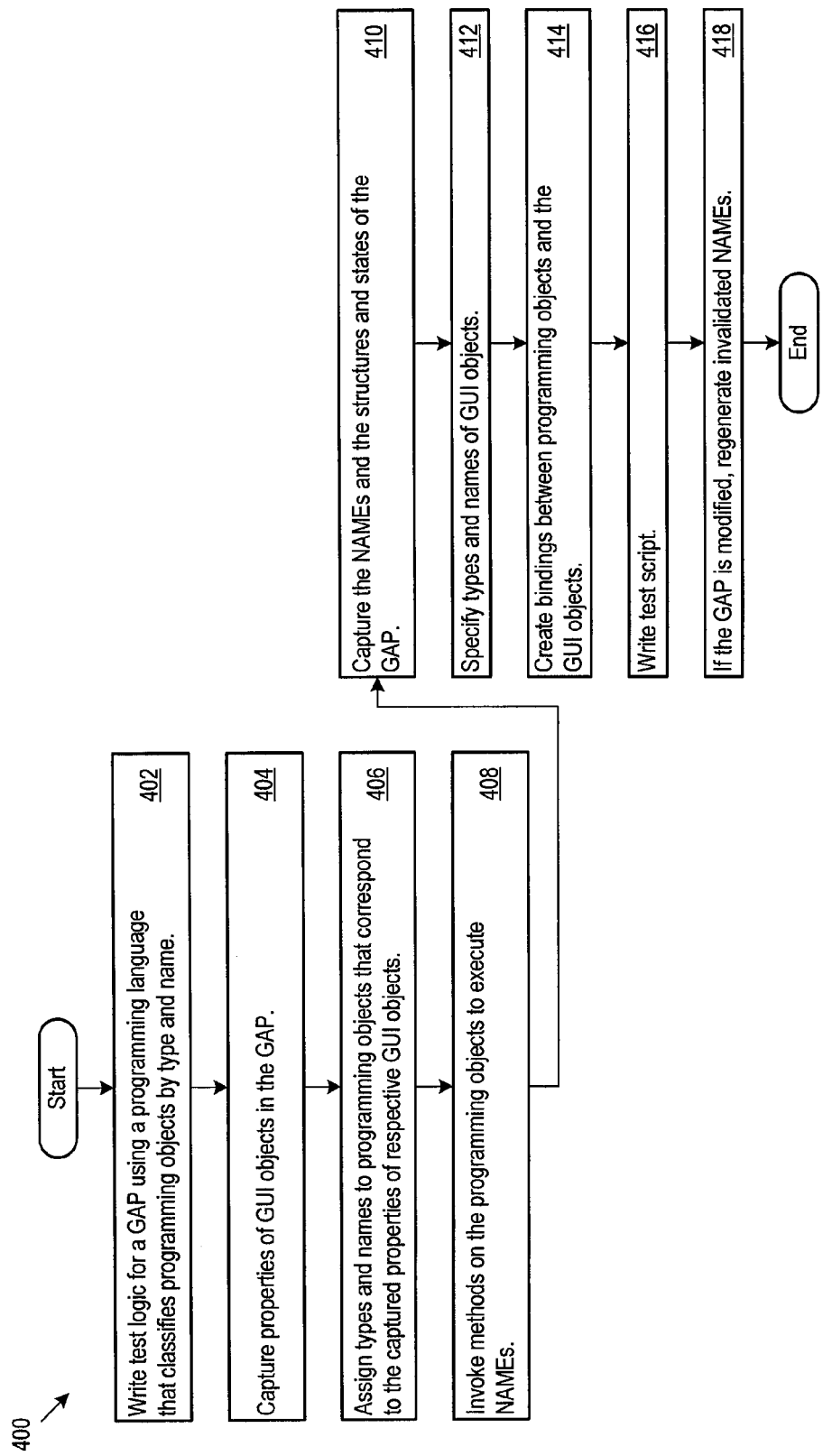
FIG. 4 shows acts that may be performed to construct a GAP test.

An overview of an embodiment of a process for constructing a GAP test environment 122 will provide a setting for explaining how GUI trees are traversed to identify final states. FIG. 4 shows logic 400 that may be performed to construct a GAP test. At 402 the test logic is written using a programming object language that include types and names. The programming objects represent GUI counterpart objects. At 404 capture/replay tools capture properties of the GUI objects. At 406 the types and names of the programming objects are assigned to the corresponding GUI objects. At 408 methods are invoked on the programming objects, which causes NAMEs to be executed. At 410, a user (e.g., a test engineer) interacts with the GAP and captures the NAMEs and the structure and states of the GAP. The captured NAMEs are sequences of low-level instructions that specify how to navigate to the GUI objects. The low-level instructions also specify the methods that must be invoked on the NAMEs in order to reproduce the user's actions. At 412, types and names of GUI objects are specified, to be later used in the test scripts. At 414, bindings (explained below) are created between the programming objects and the GUI objects. The bindings allow the programming objects to be used in different scripts for different GAPs, because the underlying NAMEs provide the GAP-specific navigation paths to the GUI objects. At 416 the test script (FIG. 2; Table 1) is written. If the GAP is modified, invalidated NAMEs may be regenerated at 418.

Figure 5:
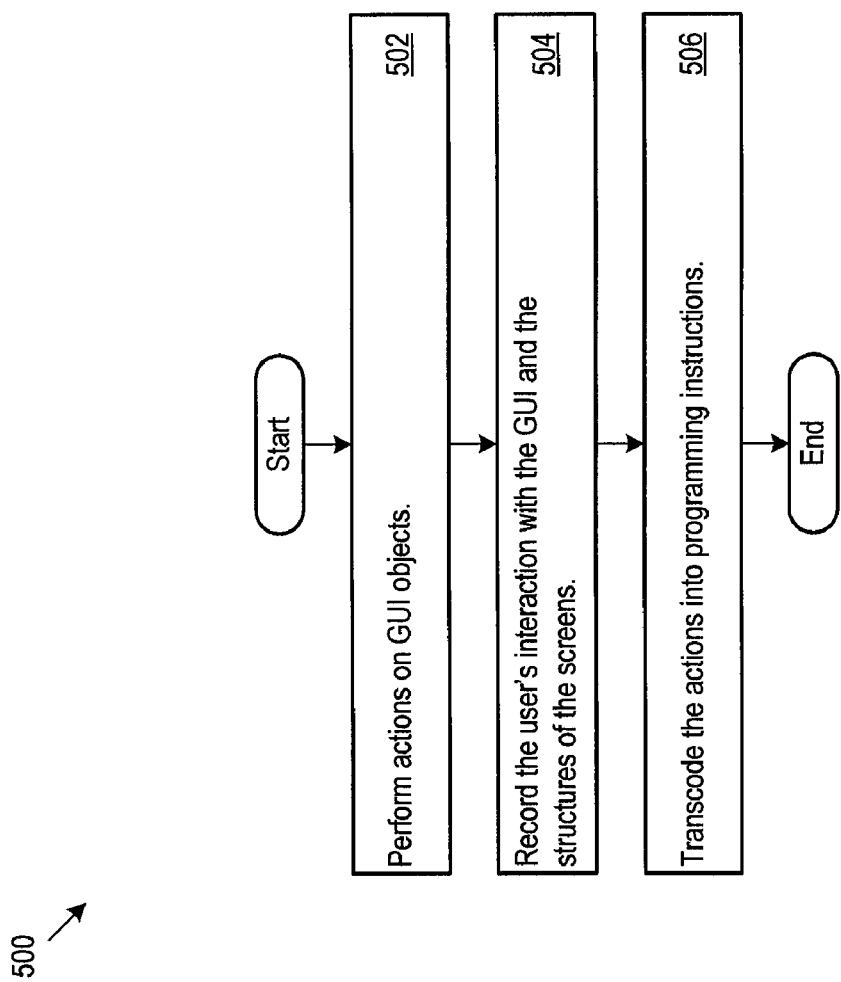
FIG. 5 shows an operational workflow for creating a test script.

FIG. 5 shows the operational workflow 500 for creating a test script. At 502 a user interacts with the GAP by performing actions against GUI objects. For example, a user interacting with a travel GAP may input departure dates and cities, and return dates and cities. At 504, as the user interacts with the GAP, the structures of the screens and the user's interactions with the GUI objects are recorded. In a version, the user's actions and screen sequences are captured at an accessibility layer (explained below) using accessibility enabled interfaces. The captured information is utilized by the GAP test environment 122 to allow the test scripts to locate GUI objects in GAPs in order to set or retrieve values or perform actions. At 506, the actions are trans-coded into programming instructions (i.e., NAMEs) that are later executed by the resulting test script.

From a tester's point of view, GUI objects have up to four functions: action producers, input data acceptors, output data retrievers, and state checkpoints. Action producers enable GAPs to switch to different states. A button-type GUI object is an example of an action producer; clicking on a button switches a GAP to a different state. Input data acceptors are GUI objects that receive data from users (e.g., text boxes). Output data retrievers are GUI objects that contain data (e.g., list views or text boxes). These objects serve as data suppliers for generating unit test cases. State checkpoint objects are GUI objects that must exist on a screen in order for a GAP to function correctly. Output GUI objects are also state checkpoint objects, because test scripts cannot retrieve data from output GUI objects that have not been initialized. Some GUI objects may have all four functions, for example, a combo box may be a state checkpoint, may contain output data, may accept input data, and may produce some action when the user makes a selection. The functions of the GUI objects, specifically which GUI objects receive values or serve as inputs and which GUI objects produce output results, are used to define the programming objects in the test scripts. Thus, the functions of the GUI objects must be specified.

Figure 6:
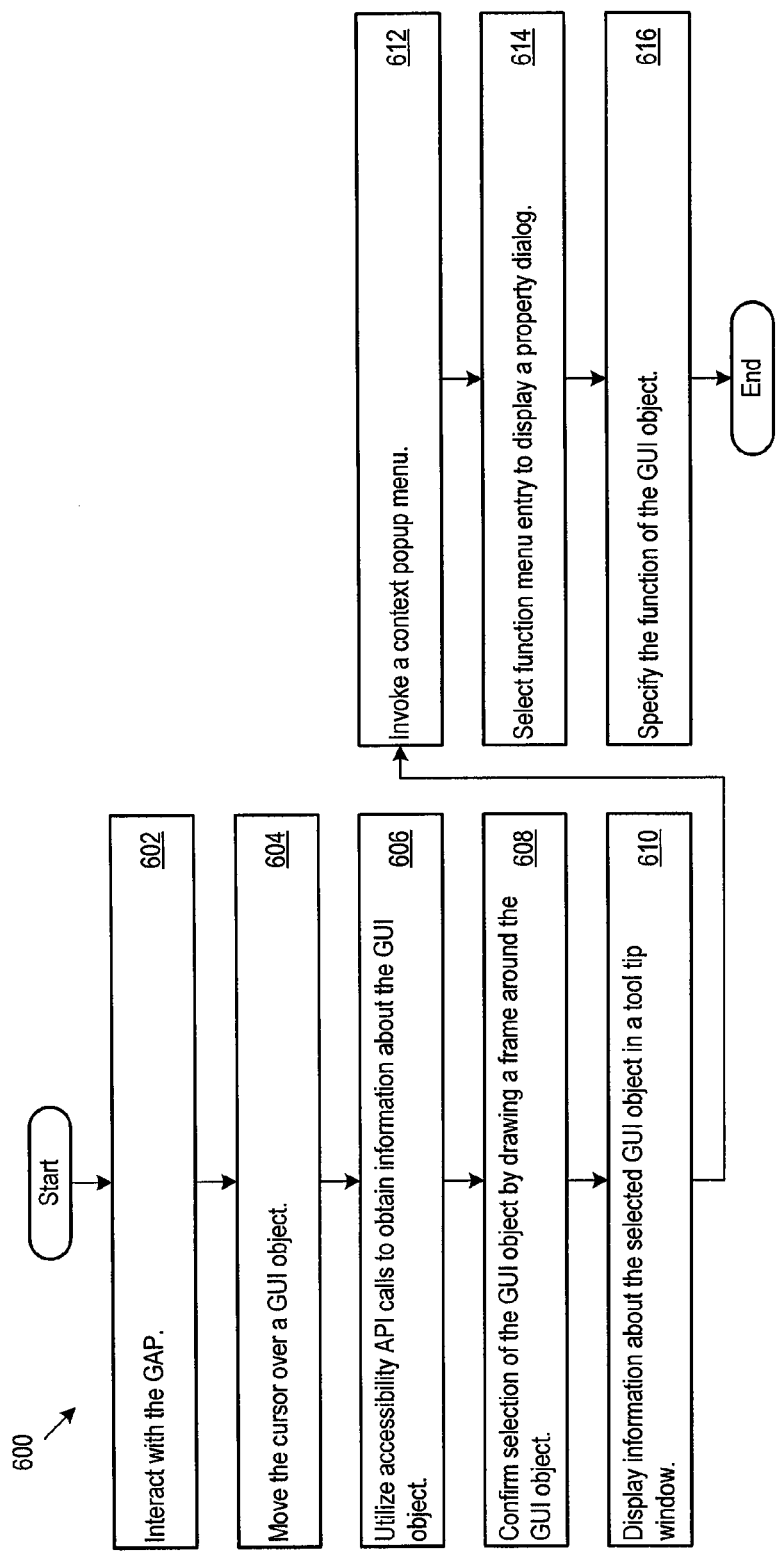
FIG. 6 shows acts for specifying the function(s) of GUI objects.

FIG. 6 shows logic 600 for specifying the function(s) of GUI objects. At 602 a user interacts with the GAP. At 604 the user moves the cursor over a GUI object. At 606 accessibility API calls are used to obtain information about the GUI object. At 608 a selection of a GUI object is confirmed by drawing a frame around the GUI object. At 610, a tool tip window displays information about the selected GUI object. At 612, a user invokes a context popup menu (for example by right clicking a mouse). The context popup menu has entries that specify a function, a type, and the name of the selected GUI object. At 614, the function menu entry is selected to display a property dialog. At 616 a user specifies the function of the GUI object (i.e., input, output, action, or checkpoint).

Figure 7:
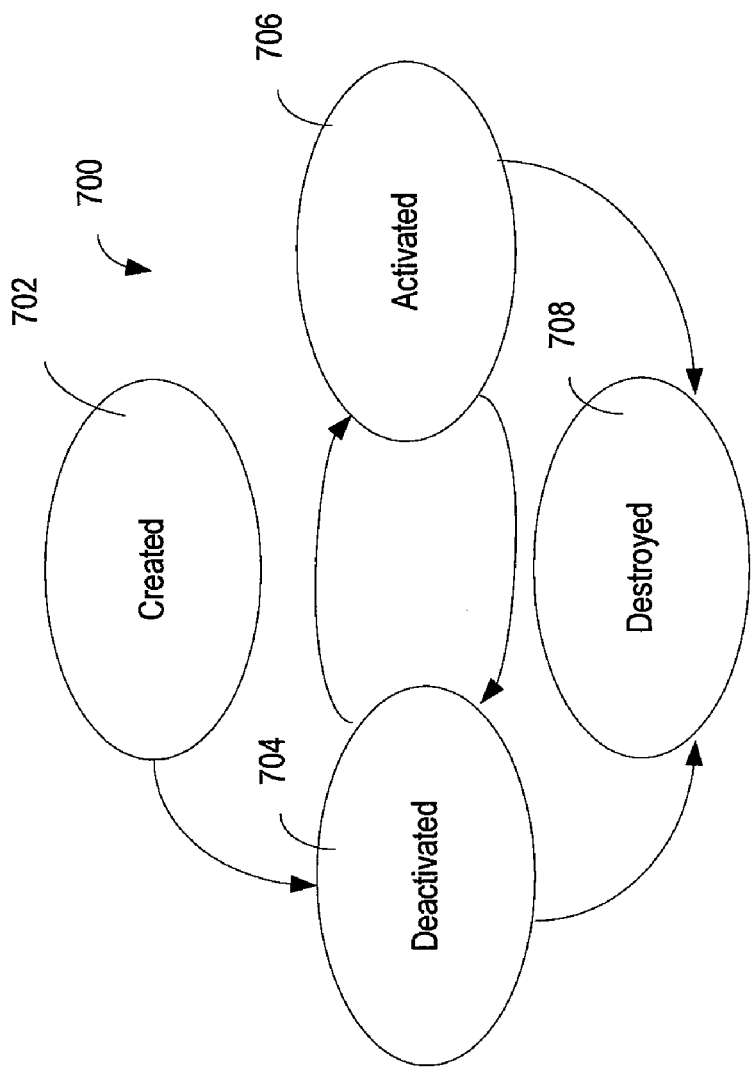
FIG. 7 is a state diagram showing the lifecycle of a GUI object.

Within a GUI framework, GUI objects are represented internally as data structures whose records specify values of properties of these objects. As a GAP program is executed, GUI objects are created, activated, and destroyed as the user interacts with the GUI screens. FIG. 7 is a state diagram 700 that shows the lifecycle of a GUI object. The ovals contain the names of the states of a GUI object. Transitions between states are shown with arrows.

The initial state of a GUI object is the created state 702. To create a GUI object, a record must be allocated, and the fields of the record initialized to initial values. Once a GUI object is created, its state transitions to a deactivated state 704 because at this point the GUI object is not accessible to users. As discussed above, GUI objects are accessible to users only when they are activated on or in relation to the execution of some GUI screen. In the activated state 706, the GUI object is visible and accessible by the user. Until it enters the destroyed state 708, the GUI object may transition between the activated and deactivated states any number of times. As an example, moving back-and-forth between screens hides (deactivates) one screen and its GUI objects and presents (activates) another screen and its GUI objects. Simply switching between states (without the user entering data or command buttons) does not change the values held by a GUI object. And a user cannot act on a deactivated GUI object. The same restrictions apply between a GAP and a test script; the test script cannot act on (e.g., read or write to) GUI objects that have been deactivated. What's more, a test script (as well as a user) cannot activate and deactivate GUI objects at will because the GAP performs these actions asynchronously as the GAP program is executed. In other words, GAP actions are locked-in the GAP program and are not modifiable by an external programs. As explained below, the GAP test environment 122 of the present disclosure includes program elements, referred to as bindings, that ensure that the GAP program has initialized and activated GUI objects before attempts are made to access them.

Bindings are defined between programming objects in testing logic and the GUI objects in the GAP. GUI objects exist within the context of the GAP. The programming objects in testing logic represent corresponding GUI objects. Bindings between programming objects and GUI objects dictate which operations can and cannot be performed on programming objects in test scripts, thereby preventing runtime exceptions.

Figure 8:
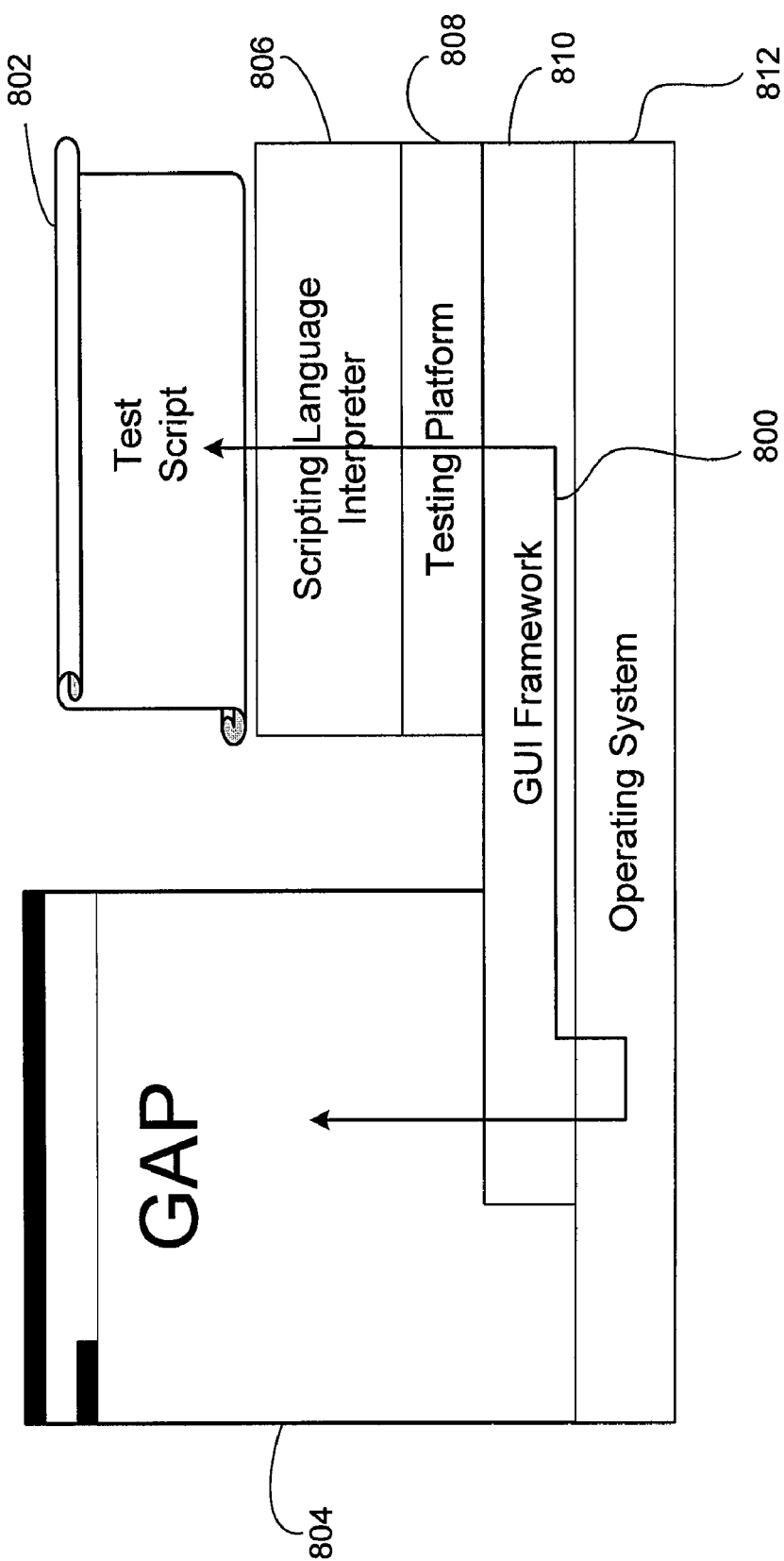
FIG. 8 illustrates a reflective connector between a test script and a GAP.

FIG. 8 illustrates the interaction between a test script 802 and a GAP 804 and provides a basis for describing how bindings may be created through a reflective connector 800. Statements of the test script 802 are processed by a scripting language interpreter 806 that is supplied with a testing platform 808. When the interpreter 806 encounters statements that access and manipulate GUI objects, it passes control to the testing platform 808. The testing platform 808 translates the statements into a series of instructions that are executed by the underlying GUI framework 810 and the operating system 812. Reflection exposes the type of a given GUI object, and it enables test scripts to invoke methods of objects whose classes were not statically known before the GAP was run. This model combines a connector 800 between scripts and GAPs with reflection so that test scripts can access and manipulate GUI objects at run-time. In test scripts, statements that access and manipulate GUI objects include the following operations: (1) navigate to some destination GUI object and (2) invoke methods to perform actions on this object, including getting and setting values. Using implementations of the concepts of reflection and connector, statements in test scripts can navigate to GUI objects in GAPs and perform operations on these objects.

The lifecycle of a programming object in a test script is tightly linked to the lifecycle of the GUI object it represents. A binding in a test script statement defines the status of a GUI object that must be met before the corresponding test script operation is executed. In other words, the operations that can be safely performed on programming objects are a function of the status of corresponding GUI objects at instances of time (e.g., past, current, or future). The status of a GUI object, as it pertains to programming objects, may be referred to as a binding type. Table 3 shows the operations that may be performed on a GUI object as a function of time and binding type.

TABLE 3

GUI Object Operations as a Function of Instance and Binding Type

| GUI Object | Binding Type | | |
|---|---|---|---|
| Instance | Active | Passive | Static |
| Past | Prohibited | Read | Read/Write |
| Present | Read/Write/Invoke | Prohibited | Read/Write |
| Future | Prohibited | Write | Write |

The column GUI Object Instance may be one of three points in time with respect to a present instance. First, a GUI object may have been instantiated in the past, that is it may have already been, but is not presently, available to the user. Second, a GUI object may be presently available for a user to act upon it. Third, a GUI object may have not yet been instantiated but will be at some time in the future. It is noted that although it is not possible to predict the values that will be held by a GUI object that is to be instantiated in the future, the values may be set in the test script (via a programming object counterpart) so that when the GUI object is instantiated, its values will be set via the reflective connector.

Table 3 also shows that there are three types of bindings: active, passive, and static. An active binding means that the GUI object that corresponds to the programming object is activated on the GUI screen. A passive binding means that the GUI object is deactivated. A static binding means that a GUI object exists on a screen that is, for example, overshadowed by another screen (e.g., layers in web browsers). Although the overshadowed object is not accessible to the user, test script operations can be performed on it. Static bindings correspond to static variables in Java which are activated when their scopes are reentered.

Table 3 also shows that there are three GUI Object Instance/Binding Type combinations where operations are prohibited: past/active, current/passive, and future/active. Past/active operations are prohibited because a GUI object cannot have an active binding if it is no longer available. Current/passive operations are prohibited simply because a GUI object that is currently available is not passive. Future/active operations are prohibited because a GUI object cannot have an active binding if it is not yet available.

For the non-prohibited combinations, there are three types of operations that may be performed on the GUI objects: reading values from them, writing values into them, and invoking methods (i.e., acting) on them. For current/active GUI objects, all three operations may be performed. A passive GUI object may be read from if it has already been instantiated (past/passive) because although a GUI object is not active its values can be retrieved by testing logic. A passive GUI object that has not yet been instantiated (future/passive) may be written to by setting the value in the GUI object in testing logic. The set value will be stored, and when the GUI object is created and activated, its value will be set. Deactivated (static binding) GUI objects may be read from or written to if the GUI object previously or presently exist(s). If the GUI object has not yet been instantiated, it cannot be read from; however, it may be written to. Referring again to FIGS. 1 and 2, the test script statement implements the bindings within the pointcuts 202 as GAP conditions 204(a)-204(c) for executing the test logic.

As stated above, the system 100 supports test script statement with aspect-oriented programming features. For example, the system 100 may implement an underlying AspectJ™-based grammar of pointcuts, but extend the grammar with GAP testing extensions. Examples of the GAP testing extensions are shown below in Table 4 in italics. The GAP testing extensions include the 'insttime' and 'binding' rules, the 'past', 'current', 'future', 'active', 'passive', and 'static' designators for the 'insttime' and 'binding' rules, as well as additional designators 'object', 'GAP', 'handler', and 'event' for the 'designator' rule.

TABLE 4

Pointcuts in Test Script Programming Language

| | |
|---|---|
| pointcut | accesstype pcname ( {params} ) : {designator [([insttime binding type] identifier)] [&& \| \|\|]); |
| accesstype | public \| private [abstract] |
| insttime | past \| current \| future |
| binding | active \| passive \| static |
| pcname | {identifier} |
| params | (type identifier) |
| designator | call \| execution \| target \| args \| cflow \| cflowbelow \| staticinitialization \| within \| if \| adviceexecution \| preinitialization \| object \| GAP \| handler \| event |
| identifier | letter {letter \| digit} |
| type | a valid Java type |

Accordingly, the system 100 establishes a test script programming language using standard designators (e.g., call and execution) to specify join points where advice is woven. The designators 'object', 'GAP', and 'event' have been added so that the testing logic may be dynamically woven into the execution of the GAP. The designator 'object' specifies programming objects (within the testing logic) that represent GUI object counterparts. The advice is triggered when the specified GUI objects are activated. The 'designator' event specifies events that trigger the execution of advice. The designator 'GAP' specifies GAPs that serve as join points. The designator 'GAP' allows test engineers to specify events and objects that serve as join points for specifically designated GAPs (analogous to specifying packages to which certain advice is applied in Java).

When advice is triggered, the GAP test environment 122 interacts with the GAP 150 through an accessibility layer. The reflective connector 140 in FIG. 1 may be implemented in the accessibility layer. The accessibility layer allows the GAP test environment 122 to retrieve attributes of GUI elements, set and retrieve attribute values, and generate and intercept events. The test logic is woven into the GAP where the test script intersects the GAP in response to GAP events. Most computing platforms include accessibility technologies to comply with the Electronic and Information Accessibility Standards set by section 508 of the U.S. Rehabilitation Act of 1973. For example, Microsoft Active Accessibility (MSAA) improves the way accessibility aids work with applications running on Windows, and Sun Microsystems Accessibility technology assists disabled users who run software on top of Java Virtual Machine (JVM). Accessibility technologies are incorporated into these and other computing platforms as well as libraries and applications in order to expose information about user interface elements. For example, a Windows GUI element implements an interface referred to as "IAccessible" so that the element may be accessed and controlled using MSAA API calls.

The GAP test environment 122 utilizes the accessibility layer and hooks to inject event listeners into the GAP. Hooks are user-defined libraries that contain callback functions ("callbacks") that are written using high-level accessibility API calls in accordance with rules dictated by accessibility technologies. Hooks enable users to extend the functionality of GAPs without changing the GAP source code. Primary functions of hooks are to receive commands to perform actions on GUI elements, to report events that occur within the GAP, and to invoke predefined functions in response to certain commands and events. Writing hooks does not require any knowledge about the GAP source code. Additional details regarding hooks, the accessibility layer, GUI elements, GAPs, and GAP testing are discussed in United States Publication Number 2008/0250051 A1 (Grechanik et al.), entitled "Automatic Test Generation for Reference Testing," hereby incorporated herein by reference in its entirety.

The GAP test environment 122 includes a hook library that is generic for all GAPs. When a target GAP is started, the accessibility layer loads predefined hook libraries in the process space of the GAP and registers addresses of callbacks that should be invoked in response to specified events. Because hooks "live" in the process spaces of GAPs, their callbacks can affect every aspect of execution of these GAPs. Hooks injected into a GAP listen to events generated by the GAP and execute instructions received from integrated systems. For example, a hook may include an instruction to disable a button until a pre-defined event occurs.

The injected event listeners respond to GAP events. The events are specified at a high level by the pointcuts. For example, the pointcut "object (static current GUIObjectDate retDate)" states that the GUI object that is mapped to the Java object retDate of the type GUIObjectDate must be currently available for action on some GUI screen (the screen itself does not have to be active). The function of the object is checked against the pointcut specification.

By way of the event listeners, the GAP test environment 122 captures GUI objects, receives input describing the state of the GAP, and generates programming classes (e.g., 124). The classes include methods that control the GAP by setting and getting values of GUI objects. The methods also initiate actions that enable the GAP to switch to different states. As the GAP switches states, the GAP test environment 122 records each state. In other words, the GAP test environment 122 traverses the GUI tree of the GAP in post-order. For each node of the tree, the GAP test environment 122 emits code that defines a programming class for the node. A format for declaring a programming class of a node is shown in Table 5.

TABLE 5

Format for Declaring a Programming Class for a GUI Node

| Modifier | Class Body |
|---|---|
| public class | 1 ClassName { |
| private int | 2 ElementId = 0x41 ; |
| private void | 3 Locate ( int ProcId ) { ...} |
| | 4 ClassName ( int ProcId ) { |
| | 5   Locate ( ProcId ) ; ... } |
| public void | 6 setValue ( type var ) {...} |
| public type | 7 getValue( ) {...} |
| public void | 8 DoIt (String act ) {...} } |

Generated classes are linked to GUI objects and contain methods for locating the objects 174 in the GAP, setting and getting their values, and performing actions on them 126. When a GAP starts, the operating system assigns a positive integer number to each window (GUI object), which is the order number in which a GUI object takes focus when tabbing through the GUI. The order number is represented by the private variable ElementId, which is initialized with a negative number as a default value (line 2). The private method "Locate" takes the process identifier of the GAP as its parameter and retrieves the ElementId for a given GUI object for of the GAP (line 3). When the GAP test environment 122 emits the code for the "Locate" method, it uses the accessibility API functions to obtain information about elements in the GUI tree that lie in the path to the GUI object. When executed in the constructor at lines 4-5, the information is used to navigate to the GUI object and obtain its identifier, which will be used in methods setValue, getvalue, and DoIt to access the GUI object directly.

Methods setValue and getvalue shown in lines 6 and 7 respectively set and retrieve values of GUI objects. The data type is "string" by default. However it may be specified otherwise, such as "integer" or "float." The code for these methods uses the accessibility API functions with the ElementId to locate the given object in the GUI and set or retrieve the value of the element. Finally, the method DoIt (line 8) takes an argument that specifies an action taken against the GUI object. If the argument is null, then a default action provided by the accessibility API function is executed. These methods throw exceptions if problems are encountered.

The event listeners detect exceptions. The GAP test environment 122 includes an exceptions handler 170 that emits code in response to the exceptions (e.g., code to display a message box that informs the user about incorrectly formatted input).

As discussed above, the test logic includes GUI classes that include programming objects (GUI variables) that are bound to GUI objects. The GUI classes reflect semantic concepts. For example, a GUI class named "GUIObjectDate" may include GUI objects that display dates, such as departure ("depDate") and return ("retDate") dates. Bindings between GUI objects and programming objects are specified by GUI object typing.

Table 6 shows an example of a definition of a GUI class "GUIObjectDate" having class objects that represent GUI objects containing date information.

TABLE 6

Definition of a GUI Class

| | |
|---|---|
| Class Name Definition | 1 GUIclass GUIObjectDate { <br> 2 <br> 3 Abstract Date getDate ( ) ; <br> 4 <br> 5 Abstract void setDate (Date) ; <br> 6 <br> 7 // . . . <br> 8 } |

Within the definition, a set of "abstract" methods are declared. The abstract methods, which may be referred to as access methods, are the methods that are called by the test logic to access and manipulate GUI objects. The methods are GAP and GUI object dependent and therefore cannot be provided in the test logic. Instead, the methods are automatically generated once bindings are set between the program objects and the GUI objects. Methods associated with programming classes are members of class definitions. The class definitions define the methods that may be invoked on the programming class.

For example, referring to Table 2 "TestLogic4Dates" includes the method call "setValue" (line 3) executed on programming object "depDate" that corresponds to a GUI object that, for example, displays a departure date. "depDate" is a member of the GUI class "GUIObjectDate" (line 2). Table 6 declares the methods that may be called on members of the GUI class "GUIObjectDate." In this example, the methods that may be called are "getDate" and "setDate." The "setDate" and "getDate" methods are programs that are executed through the accessibility layer described above. The programs may be defined in accessibility technology libraries or may be custom designed programs. The programs are associated with programming objects through class definitions. For example, the programming object "depDate" must be added to the programming class "GUIObjectDate" before it can be referenced as a programming object in Table 2, line 2. Programming objects are added to programming classes by referencing their corresponding GUI objects on GUI screens and opening a typing dialog 172. The typing dialog 172 bridges the code between Table 5 and Table 6, and binds GUI objects to GUI parameters specified in the GUI aspects.

Figure 9:
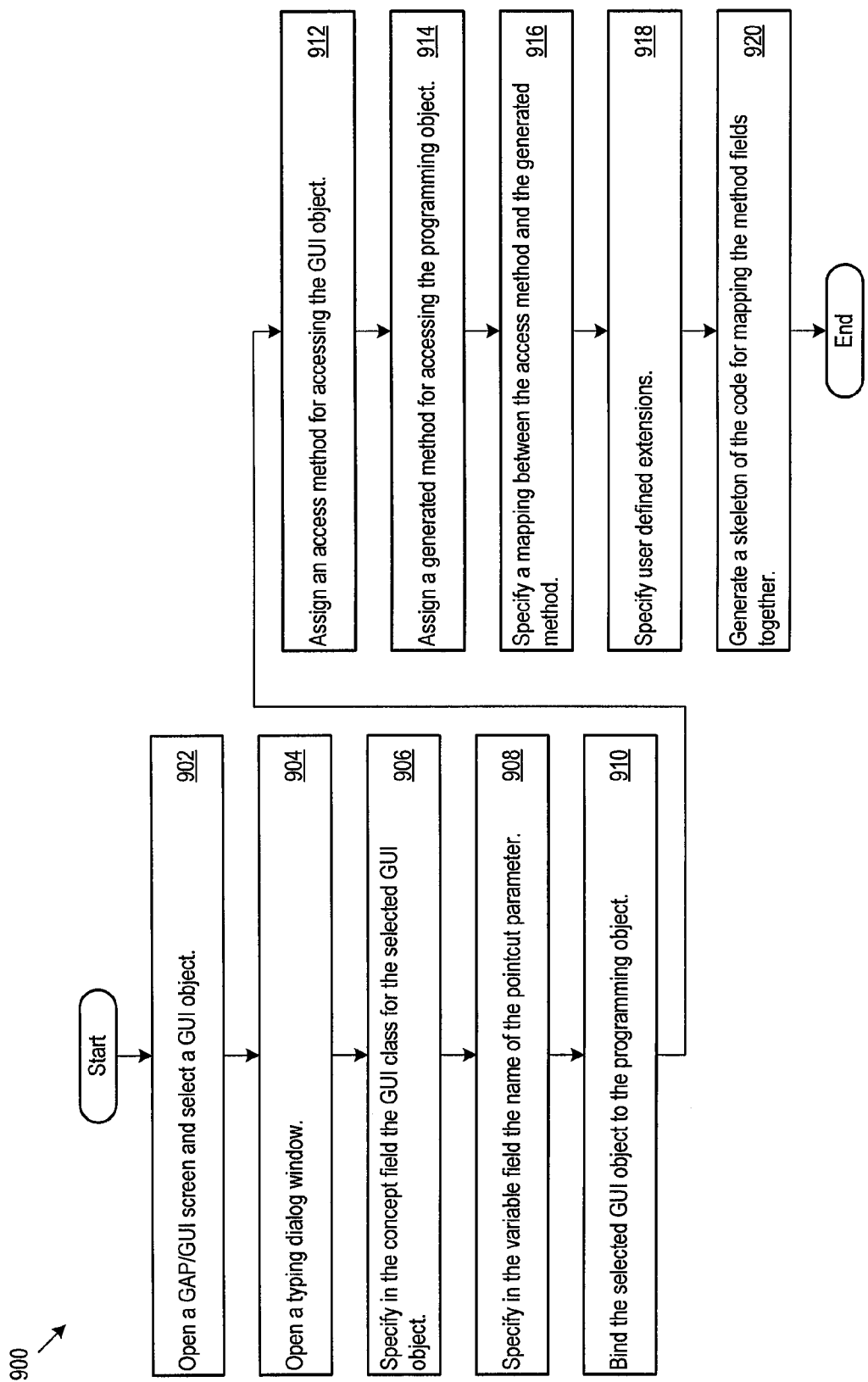
FIG. 9 shows method steps of a version of a typing dialog for adding programming objects to programming classes.
Figure 10:
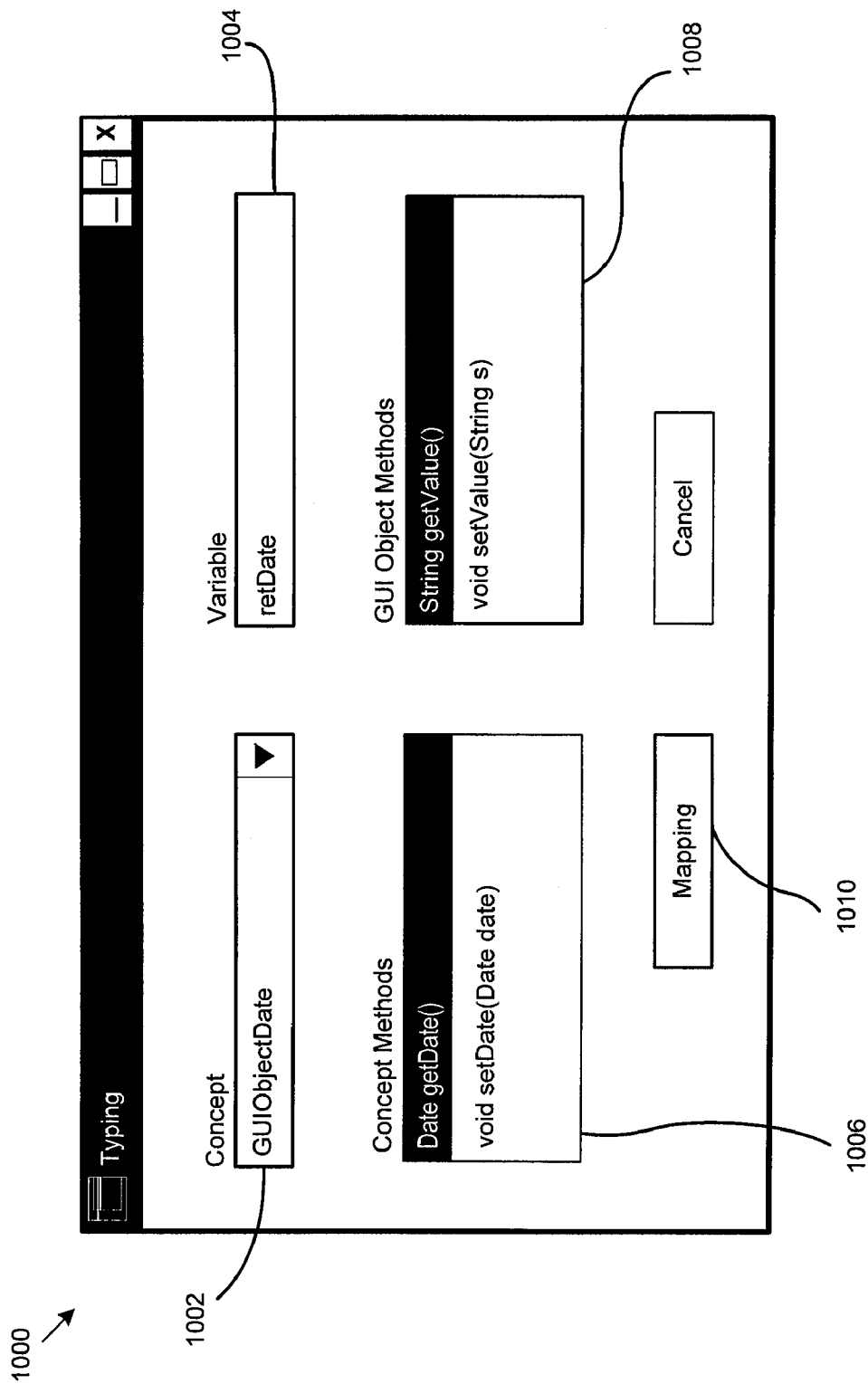
FIG. 10 shows an example of a typing dialog window.

FIG. 9 shows method steps of a version of a typing dialog 172 for adding programming objects to programming classes. At 902 a user opens a GAP/GUI screen and selects a GUI object. In response, the typing dialog 172, opens a typing dialog window (904). An example of a typing dialog window 1000 is shown in FIG. 10. The typing dialog window 1000 includes a Concept field 1002 and a Variable field 1004. The GUI class for the selected GUI object is specified in the Concept field 1002 (906). The name of the pointcut parameter is specified in the Variable field 1004 (908). The typing dialog 172 binds the selected GUI object to "retDate" (910). In this example, the selected GUI object is assigned the name "retDate" and class "GUIObjectDate".

Once the selected GUI object is assigned a class, access methods of the GUI class may be automatically generated so that the test logic can access and manipulate the selected GUI object (912). Access methods may be preprogrammed methods that are stored in a typing dialog library 188 of user defined access methods that define how GUI objects are accessed. Each programming class is associated with one or more selectable access method(s). The association(s) between the programming classes and the access methods may also be stored in the library 188. In the example shown in FIG. 10, access methods for accessing GUI objects of the class "GUIObjectDate" are "Date getDate( )" and "void setDate(Date date)." An access method may be selected based on the action that is to be invoked on the selected GUI object during testing.

As discussed above, GUI objects are represented as corresponding programming objects in a test script. The method for accessing the programming object that corresponds to the selected GUI object may be assigned (914) in a GUI Object Methods field 1008. As shown in FIG. 9, the typing dialog window 1000 includes a Concept Methods field 1006 for assigning the access method and the GUI Object Methods field 1008 for assigning the method that accesses the programming object (which may be referred to as the "generated method"). Generated methods may be preprogrammed methods that are stored in the typing dialog library 188.

Using the "Mapping" button 1010, a user may specify a mapping between the access method and the generated method (916), and/or specify user defined extensions (918). For example, a user may map the "getValue" method from the GUI Object Methods field 1008 to the "getDate" method in the Concept Methods field 1006. The typing dialog 172 generates a skeleton of the code for mapping the method fields together (920), e.g., "getvalue" to "getDate." Additional details regarding GUI element typing and mapping systems are discussed in commonly owned, co-pending U.S. patent application having Ser. No. 12/038,665, filed Feb. 27, 2008, (Grechanik et al.), entitled "Test Script Transformation Architecture," hereby incorporated herein by reference in its entirety.

A user may edit the code to fix a return type mismatch, if any. Table 7 shows an example of mapping code generated by the typing dialog in the left column. The user edited code is shown in the right column.

TABLE 7

Typing Dialog Code

| Generated by Typing Dialog | Edited by User |
| --- | --- |
| Date getDate ( ) {<br>  Return (objstub.getValue ( ));<br>} | Date getDate ( ) {<br>  Return new Date (objstub.getValue ( ));<br>} |

The typing dialog 172 implants hooks in the GAP to detect when GUI objects appear and disappear on the screen as programming objects are added to programming classes. When a selected GUI object appears on the screen, the GAP test environment 122 updates its data structure (e.g., marks "retDate" as an active binding). If all of the parameters for a given pointcut are present, the advice on the pointcut call is automatically invoked, achieving automatic weaving of advices. The test script interpreter 186 evaluates the pointcuts detected by the hook to determine whether all of the pointcuts are present for the GUI object.

The primary operations on GUI objects are (a) navigating to them and (b) invoking methods on them, including setting and getting their values. These operations are executed by applying test script advice to the join points and automatically generating access methods in accord with user input collected by way of the typing dialog window 1000. The semantics of these primary operations are described below.

Figure 11:
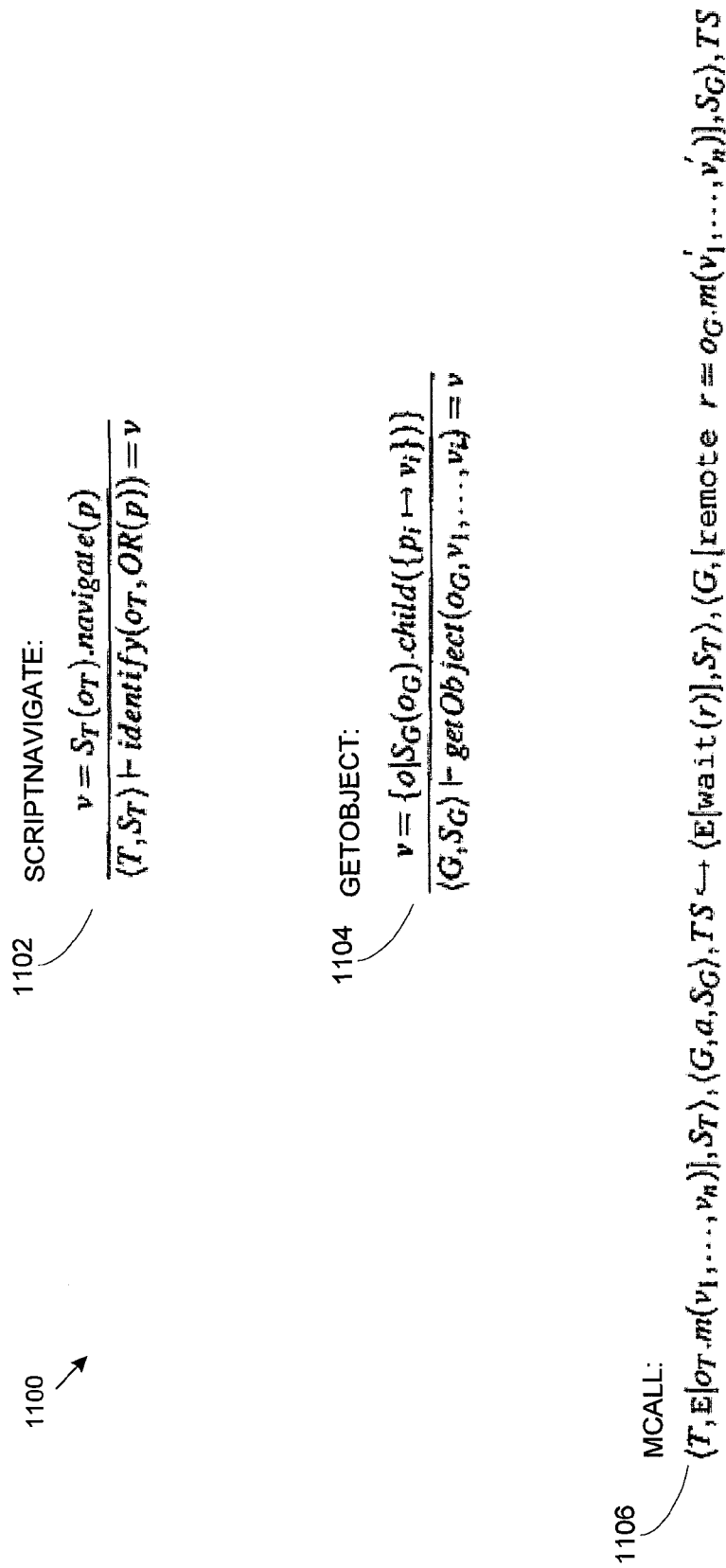
Figure 12:
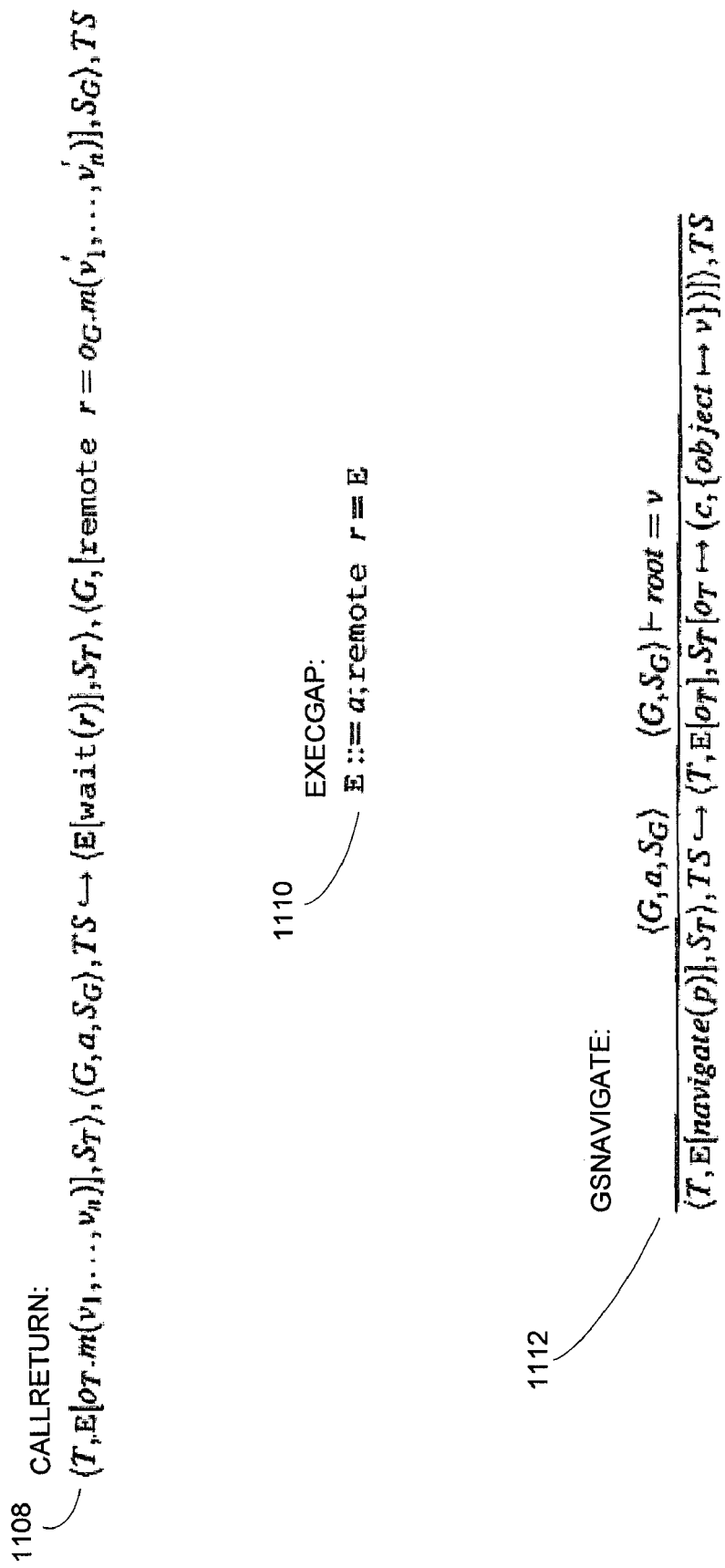

To apply advice to join points, the test script programming language running in GAP test environment 122 in the system 100 uses reduction rules that define operational semantics for performing operations on the programming objects that represent the GUI objects. The reduction rules 1100 are shown in FIGS. 11, 12, and 13 and include SCRIPTNAVIGATE 1102, GETOBJECT 1104, MCALL 1106, CALLRETURN 1108, EXECGAP 1110, GSNAVIGATE 1112, AND GSGETOBJECT 1114.

The GAP test environment 122 defines a testing system TS that comprises the GAP G and the test script T, referred to collectively as programs, P. The programs P include a set of locations and a set of values. The state, S, of the testing system, TS, is the union of the state of the GAP and the test script. The state of a program, P, is obtained via the mapping function ProgramState: TSxP→Sp. In the reduction rules, Sp is shorthand for applying the ProgramState function to obtain the state S of some program P, which may be either the test script, T, or the GAP, G. The evaluation relation, defined by the reduction rules, has the form TS⇒TS', where TS=(T,e, $S_T$), (G,a,$S_G$), read "The test script, T, and the GAP, G are members of the testing system, TS." Executing the expression e with the initial state $S_T$ leads to executing the action a with the initial state $S_G$, and the system TS transitions to a new system TS'. In these rules T and G are programs and S is a state. Transition⇒ ⊆(P, e, $S_p$)×(P, e, $S_p$), where P is either G or T.

Figure 14:
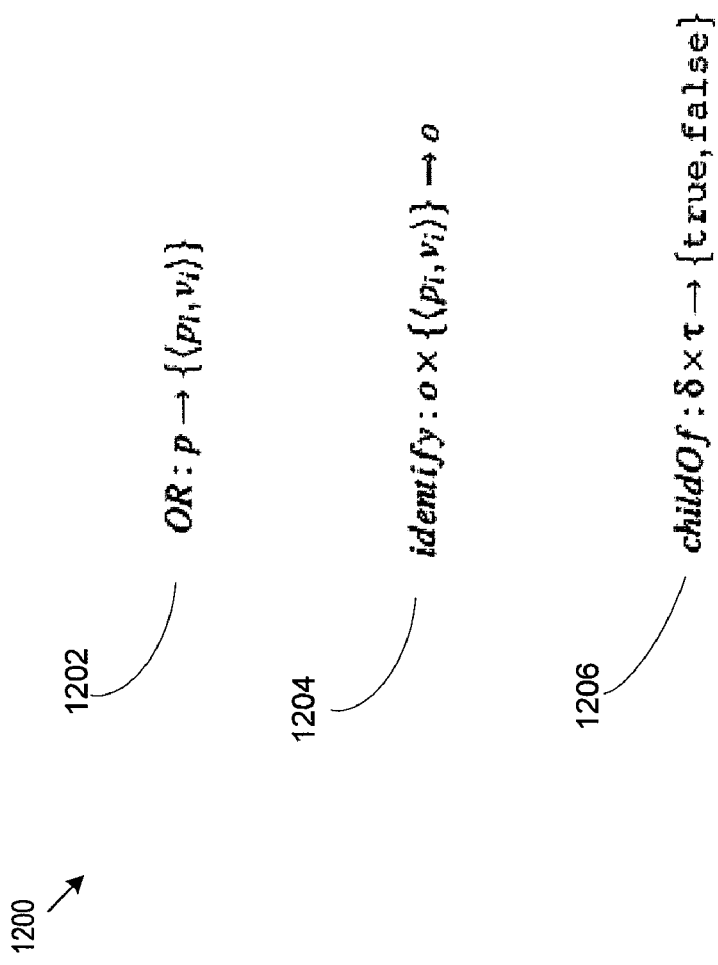
FIG. 14 shows helper functions for the reduction rules shown in FIGS. 11, 12, and 13.

An executed test script expression changes not only the state of the test script, but also changes the state(s) of the GAP(s) to which the script is connected (i.e., the GUI objects accessed and controlled by the test script expression). Statements in test scripts that access and manipulate GUI objects consist of the following operations: (1) navigate to some destination GUI object and (2) invoke methods to perform actions on the GUI object. GSNAVIGATE and GSGETOBJECT show how test scripts manipulate the GAP by initiating user action a on it. These rules are evaluated to reference the GUI object V of type c in the test script. The rule SCRIPTNAVIGATE is executed on the script side and it returns the object v which is contained in the GUI object that is referenced in the test script using the object $o_T$. The properties of the returned object v are defined in an object register (OR) under the name p. The rule GETOBJECT is executed on the GAP side and it returns a collection of objects v, which are contained in the GUI object that is referenced in the GAP using the object $o_G$. The rule MCALL shows that evaluation of a test script expression that references a GAP object waits for the result of the action performed on the GAP. The rule CALLRETURN returns the result of method execution from the GAP to the test script, while the rule EXECGAP evaluates the action at the GAP. E stands for the context in which a given rule is applied. Helper functions 1200 are shown in FIG. 14 where the function OR 1202 computes the set of properties and their values of a GUI object whose entry in the object repository is labeled p. The function identify 1204 returns a child object whose properties values match given values. The function childOf 1206 returns true if the GUI object of the type δ is a child object of the parent object of the type τ, otherwise it returns false. The test script interpreter 186 executes the rules discussed above.

Several different flight reservation GAPs were tested by implementing the test logic shown in Table 8. In the first half of the test, the test logic was implemented using QuickTest® Professional (QTP) to create a test script for testing dates in a first commercial GAP. The test script was then modified using the QTP script debugger against a second commercial GAP in the following process: The test script was applied to test the second GAP. The change of GAP under test invalidated NAMEs (every single NAME broke in the second GAP test) and generated exceptions, causing the test to terminate. The exceptions were analyzed inside the QTP script debugger, and then the test script was modified, and the test was rerun. The process of analyzing exceptions and modifying test scripts was repeated until the test script ran without throwing any exceptions. The effort of modifying the test script was close to that of a complete rewrite. Over all, the cost of composing each script was approximately 90 minutes, with variation under 5 minutes.

Compared to typical test scripts which often implement multiple test logic, the test script used in the experiment is a relatively simple one. In more complicated test scripts test engineers introduce loops to increase coverage. Consider a test script that contains a loop with code that reads in and analyzes data from files, computes a result from the data, and inserts the result in a GUI object. Computing the result may take hours depending on the size of the files. Each time an exception is thrown, the results must be discarded, the script modified, and then rerun. Although it is possible to comment-out some loops to speed up execution, doing so changes the test logic. As a consequence, the reusability of the test script is diminished further.

In the second half of the test, a GAP test 22 based on the test logic of Table 8 was developed to test three commercial air-ticket-booking GAPs: GAP A, GAP B, and GAP C. The test logic was easily implemented in Java-like reusable test functions TestLogic4Date( ) (Table 2) and TestLogic4( ). Four GUI classes were defined: GuiObjDate, GuiObjAirport, GuiObjNumber, and GuiObjTrigger. Composition rules were written so that both functions could be applied to test GAP A, GAP B, and GAP C. The tests were applied when the GUI objects representing the required concepts appeared on the GUI screen, namely the starting and ending dates for TestLogic4Date ( ), and, for TestLogic4Flight ( ), the starting and ending dates, the departing and destination airports, the ticket quantity, and the submit button.

The completed commercial GAPs were not needed in the development of the test functions and composition rules for the GAP test 22 since these parts of the test pertain to high level semantic concepts from software requirements. To specify the mapping from the actual GUI objects to GUI variables in composition rules, the GAPs were run, the GUI objects that map to the pointcut criteria in the composition rules were located, and the mapping was specified. GUI objects representing itinerary information was mapped to high level GUI variables. Multiple GUI objects form a GUI structure: GUI objects representing airline, flight number, departing and arriving times and airport form an "itinerary" record which is mapped to the itinerary variable in the composition rule. This is a many-to-one mapping, as there are an unknown number of itinerary item on the screen. Actions performed on the itinerary variables in the reusable testing logic are translated to NAMEs that act on every itinerary record on the result screen. The maps were saved under three different mapping profiles, one for each travel agency site.

During the test session, the individual mapping profiles were loaded when each respective GAP was loaded. When the expected GUI objects appeared on the screen, the pointcuts were recognized and the advice was loaded and executed.

The entire process to test all three GAPs using the structure of the GAP test 22 disclosed herein was approximately ninety minutes, or the equivalent time to develop a QTP script for a single application. The resulting test script was proven useable on GAPs that share similar functionality.

TABLE 8

Test Logic 1 set departure date to a random date
2     s . t . random date >= today ;
3 set return date to a random date;
4 if (return date <= departure date) {
5         raise an exception;
6 }
7 set departure city;
8 set destination city;
9 assertTrue (departure city != destination city);
10 click on search button to start search;
11 assertTrue (a transition screen with progress bar
12         appears for <= I min);
13 assertTrue (a screen with a list of tickets
14         satisfying the above criteria appears);

It is also much easier to evolve test logic using the GAP test environment 122 than it is using other test environments. For example, if GAPs are modified to accept city names instead of airport codes, only the test logic 176 in the GAP test environment 122 need be changed to update the GAP test. The updated GAP test may then be used to test any and all GAPs that have been modified to accept city names instead of airport codes. In contrast, in other test environments (e.g., QTP) all test scripts that reference the modified GUI object must be changed because the test logic is tangled in each separate test script (for each GAP). Thus, test scripts within the GAP test environment 122 are not only reusable, but are also modifiable.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the voice detector have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for graphical user interface application testing, comprising:
    generating in computer readable memory a programming class for a graphical user interface (GUI) object in a graphical user interface application (GAP);
    providing a value manipulation method in the programming class for the GUI object;
    reading in the memory a test script statement from a test script that references the GUI object with a programming object defined in the test script, the programming object comprising a programming object value;
    establishing in the memory a reflective connector between the test script statement and the GUI object in the GAP to provide access to the GUI object, by linking the test script statements and the GUI object through an accessibility layer; and in connection with executing the test script statement, calling the value manipulation method through the connector to manipulate the programming object value.

2. A method for graphical user interface application testing, comprising:

generating in computer readable memory a programming class for a graphical user interface (GUI) object in a graphical user interface application (GAP);

providing a value manipulation method in the programming class for the GUI object;

reading in the memory a test script statement from a test script that references the GUI object with a programming object defined in the test script, the programming object comprising a programming object value and reading from the test script a GAP pointcut definition, wherein the the GAP pointcut definition specifies a condition to be satisfied for execution of the test script statement;

establishing in the memory a reflective connector between the test script statement and the GUI object in the GAP; and in connection with executing the test script statement, calling the value manipulation method through the connector to manipulate the programming object value.

3. The method of claim 2, where the condition comprises: a join point in the GAP that specifies a GUI element condition.

4. The method of claim 2, where the GAP pointcut definition comprises:

an instantiation time rule.

5. The method of claim 4, where the instantiation time rule comprises:

a 'past' designator denoting prior availability of the GUI object during execution of the GAP;

a 'current' designator denoting existing availability of the GUI object during execution of the GAP; or a 'future' designator denoting later availability of the GUI object during execution of the GAP.

6. The method of claim 2, where the GAP pointcut definition comprises:

a binding rule.

7. The method of claim 6, where the binding rule comprises:

an 'active' designator denoting current availability of the GUI object in the GAP;

a 'passive' designator denoting deactivation of the GUI object in the GAP; or a 'static' designator denoting inaccessible existence of the GUI object in the GAP.

8. An article of manufacture, comprising:

a machine readable medium; and logic stored on the medium that when executed by a processor, causes the processor to:

generate in computer readable memory a programming class for a graphical user interface (GUI) object in a graphical user interface application (GAP);

provide a value manipulation method in the programming class for the GUI object;

read in the memory a test script statement from a test script that references the GUI object with a programming object defined in the test script, the programming object comprising a programming object value and reading from the test script a GAP pointcut definition;

establish in the memory a reflective connector between the test script statement and the GUI object in the GAP to provide access to the GUI object, by linking the test script statements and the GUI object through an accessibility layer; and in connection with executing the test script statement, call the value manipulation method through the connector to manipulate the programming object value.

9. An article of manufacture, comprising:

a machine readable medium; and logic stored on the medium that when executed by a processor, causes the processor to:

generate in computer readable memory a programming class for a graphical user interface (GUI) object in a graphical user interface application (GAP);

provide a value manipulation method in the programming class for the GUI object;

read in the memory a test script statement from a test script that references the GUI object with a programming object defined in the test script, the programming object comprising a programming object value and reading from the test script a GAP pointcut definition, wherein the GAP pointcut definition specifies a condition to be satisfied for execution of the test script statement, a machine readable medium;

establish in the memory a reflective connector between the test script statement and the GUI object in the GAP; and in connection with executing the test script statement, call the value manipulation method through the connector to manipulate the programming object value.

10. The article of claim 9, where the condition comprises: a join point in the GAP that specifies a GUI element condition.

11. The article of claim 9, where the GAP pointcut definition comprises: an instantiation time rule.

12. The article of claim 11, where the instantiation time rule comprises:

a 'past' designator denoting prior availability of the GUI object during execution of the GAP;

a 'current' designator denoting existing availability of the GUI object during execution of the GAP; or a 'future' designator denoting later availability of the GUI object during execution of the GAP.

13. The article of claim 9, where the GAP pointcut definition comprises: a binding rule.

14. The article of claim 13, where the binding rule comprises:

an 'active' designator denoting current availability of the GUI object in the GAP;

a 'passive' designator denoting deactivation of the GUI object in the GAP; or a 'static' designator denoting inaccessible existence of the GUI object in the GAP.

15. A system for graphical user interface application testing, comprising:

a processor;

a memory coupled to the processor and comprising a GAP test environment comprising logic that, when executed by the processor, causes the processor to:

generate in computer readable memory a programming class for a graphical user interface (GUI) object in a graphical user interface application (GAP);

provide a value manipulation method in the programming class for the GUI object;

read in the memory a test script statement from a test script that references the GUI object with a programming object defined in the test script, the programming object comprising a programming object value;

establish in the memory a reflective connector between the test script statement and the GUI object in the GAP to provide access to the GUI object, by linking the test script statements and the GUI object through an accessibility layer; and in connection with executing the test script statement, call the value manipulation method through the connector to manipulate the programming object value.

16. A system for graphical user interface application testing, comprising:

a processor;

a memory coupled to the processor and comprising a GAP test environment comprising logic that, when executed by the processor, causes the processor to:

generate in computer readable memory a programming class for a graphical user interface (GUI) object in a graphical user interface application (GAP);

provide a value manipulation method in the programming class for the GUI object;

read in the memory a test script statement from a test script that references the GUI object with a programming object defined in the test script, the programming object comprising a programming object value and read from the test script a GAP pointcut definition, wherein the GAP pointcut definition specifies a condition to be satisfied for execution of the test script statement;

establish in the memory a reflective connector between the test script statement and the GUI object in the GAP; and in connection with executing the test script statement, call the value manipulation method through the connector to manipulate the programming object value.

17. The system of claim 16, where the condition comprises:

a join point in the GAP that specifies a GUI element condition.

18. The system of claim 16, where the GAP pointcut definition comprises: an instantiation time rule.

19. The system of claim 18, where the instantiation time rule comprises:

a 'past' designator denoting prior availability of the GUI object during execution of the GAP;

a 'current' designator denoting existing availability of the GUI object during execution of the GAP; or a 'future' designator denoting later availability of the GUI object during execution of the GAP.

20. The system of claim 16, where the GAP pointcut definition comprises: a binding rule.

21. The system of claim 20, where the binding rule comprises:

an 'active' designator denoting current availability of the GUI object in the GAP;

a 'passive' designator denoting deactivation of the GUI object in the GAP; or a 'static' designator denoting inaccessible existence of the GUI object in the GAP.

* * * * *

UNITED STATES PATENT AND TRADEMARK OFFICE
CERTIFICATE OF CORRECTION

PATENT NO. : 8,370,811 B2
APPLICATION NO. : 12/504467
DATED : February 5, 2013
INVENTOR(S) : Mark Grechanik et al.

It is certified that error appears in the above-identified patent and that said Letters Patent is hereby corrected as shown below:

In the Claims:

In column 19, claim 2, line 19, replace "wherein the the GAP" with --wherein the GAP--.

Signed and Sealed this
Sixteenth Day of April, 2013

Teresa Stanek Rea
*Acting Director of the United States Patent and Trademark Office*